(12) United States Patent
McKee et al.

(10) Patent No.: US 10,882,445 B2
(45) Date of Patent: Jan. 5, 2021

(54) METHOD FOR PROVIDING AN ALERT FOR A DISTANCE TRAVELLED BY A WORKING VEHICLE

(71) Applicant: J. C. Bamford Excavators Limited, Uttoxeter (GB)

(72) Inventors: Michael McKee, Uttoxeter (GB); Adeyosola Sodeinde, Uttoxeter (GB); Matt Cook, Uttoxeter (GB)

(73) Assignee: J. C. Bamford Excavators Limited, Uttoxeter (GB)

( * ) Notice: Subject to any disclaimer, the term of this patent is extended or adjusted under 35 U.S.C. 154(b) by 208 days.

(21) Appl. No.: 15/291,920

(22) Filed: Oct. 12, 2016

(65) Prior Publication Data
US 2017/0106792 A1 Apr. 20, 2017

(30) Foreign Application Priority Data
Oct. 15, 2015 (GB) .................................. 1518265.2

(51) Int. Cl.
| | | |
|---|---|---|
| *B60Q 9/00* | (2006.01) | |
| *B66F 17/00* | (2006.01) | |
| *E02F 9/16* | (2006.01) | |
| *E02F 9/20* | (2006.01) | |
| *E02F 9/26* | (2006.01) | |
| *B66F 9/075* | (2006.01) | |
| *E02F 9/08* | (2006.01) | |
| *B66F 9/065* | (2006.01) | |

(Continued)

(52) U.S. Cl.
CPC ................ *B60Q 9/00* (2013.01); *B66F 9/065* (2013.01); *B66F 9/0755* (2013.01); *B66F 17/003* (2013.01); *E02F 9/085* (2013.01); *E02F 9/166* (2013.01); *E02F 9/2079* (2013.01); *E02F 9/26* (2013.01); *E02F 9/264* (2013.01); *E02F 3/32* (2013.01); *E02F 3/964* (2013.01)

(58) Field of Classification Search
None
See application file for complete search history.

(56) References Cited

U.S. PATENT DOCUMENTS

| | | | |
|---|---|---|---|
| 3,972,022 A | | 7/1976 | Goto et al. |
| 4,456,093 A | * | 6/1984 | Finley .................. B66F 17/006 182/18 |
| 4,501,005 A | | 2/1985 | Miller |

(Continued)

FOREIGN PATENT DOCUMENTS

| | | |
|---|---|---|
| CA | 2062686 A1 | 9/1992 |
| CN | 104 975 629 A | 10/2015 |

(Continued)

OTHER PUBLICATIONS

Search Report for GB 1518265.2 dated Mar. 23, 2016.
Extended European Search Report for EP 16193149.8, dated Mar. 20, 2017.

*Primary Examiner* — Navid Ziaeianmehdizadeh
(74) *Attorney, Agent, or Firm* — Marshall, Gerstein & Borun LLP

(57) ABSTRACT

A method for providing an alert for a distance travelled by a vehicle including the steps: enabling an alert system; setting a target distance to be travelled by the vehicle; moving the vehicle; comparing the distance travelled by the vehicle and the target distance; and providing an alert based on the comparison.

19 Claims, 4 Drawing Sheets

(51) Int. Cl.
*E02F 3/32* (2006.01)
*E02F 3/96* (2006.01)

(56) References Cited

U.S. PATENT DOCUMENTS

| | | | |
|---|---|---|---|
| 5,377,777 A * | 1/1995 | Moore | B60N 2/143 |
| | | | 180/272 |
| 6,927,682 B1 | 8/2005 | Touhey et al. | |
| 2003/0024132 A1* | 2/2003 | Kokura | B66F 9/0755 |
| | | | 33/712 |
| 2005/0131610 A1* | 6/2005 | Sahm | E02F 3/431 |
| | | | 701/50 |
| 2008/0127531 A1 | 6/2008 | Stanek et al. | |
| 2008/0275596 A1* | 11/2008 | Tarasinski | E02F 9/2004 |
| | | | 701/1 |
| 2014/0022067 A1* | 1/2014 | Dambra | B60P 1/4464 |
| | | | 340/431 |
| 2014/0277964 A1 | 9/2014 | Rikkola et al. | |
| 2015/0292182 A1 | 10/2015 | McKee | |
| 2016/0002890 A1* | 1/2016 | Harper | E02F 9/245 |
| | | | 701/33.7 |
| 2016/0108602 A1* | 4/2016 | Singh | E02F 3/434 |
| | | | 701/50 |
| 2016/0281323 A1 | 9/2016 | Imaizumi | |
| 2017/0073935 A1* | 3/2017 | Friend | E02F 9/265 |

FOREIGN PATENT DOCUMENTS

| | | |
|---|---|---|
| GB | 2011687 A | 7/1979 |
| GB | 2046486 A | 11/1980 |
| GB | 2490679 A | 11/2012 |
| JP | 3-430361 B2 | 7/2003 |
| WO | WO-2015/129932 A1 | 9/2015 |
| WO | WO-2016032812 A1 | 3/2016 |

* cited by examiner

METHOD FOR PROVIDING AN ALERT FOR A DISTANCE TRAVELLED BY A WORKING VEHICLE

The present invention relates to a method for providing an alert, in particular an alert for a distance travelled by a vehicle, such as a working vehicle.

BACKGROUND OF THE INVENTION

Known working vehicles, such as backhoe loaders, have a materials handling implement, such as a loading shovel, mounted on the front of the vehicle and a further materials handling implement, such as a backhoe, mounted on the back of the vehicle. Other working vehicles, for example excavators or telescopic handlers have a materials handling implement mounted on one end of the vehicle.

Known backhoe loaders include an arm assembly having an arm, known as a boom, pivotally mounted about a generally horizontal axis relative to a chassis of the vehicle. A further arm, known as a dipper, may be attached to an end of the boom remote from the chassis and may be pivotable about a generally horizontal axis. A material handling implement, such as a bucket or an auger, may be pivotably mounted on an end of the dipper. The boom may be raised and lowered by operation of a first hydraulic ram. The dipper may be moveable relative to the boom by operation of a second hydraulic ram. The bucket may be moveable relative to the dipper by operation of a third hydraulic ram.

When the operator wishes to move the vehicle, the seat is orientated in a forwards facing direction and the operator can use controls such as the steering wheel, a foot brake, a foot clutch, a foot accelerator, forward and reverse levers and a gear box having forward and reverse gears to move the vehicle over the ground. When it is necessary to move the vehicle a distance from one location to another location, the front loading shovel will be lifted above ground level and the vehicle can be driven, in the manner of a car (automobile), with the operator facing forwards and using the steering wheel, brake, clutch and accelerator controls (i.e. the vehicle is in a 'moving' state).

When the operator wishes to use the backhoe, the vehicle is changed into a 'working' state. In this condition, the seat is rotated to face rearwardly. When using the backhoe the vehicle will be stationary, and indeed some or all of the wheels may be lifted off the ground by operation of stabilizer legs and/or lowering of the front loading shovel into engagement with the ground. Known backhoe loaders have a stabilizer on the rear right hand side of the vehicle and a further stabilizer on the rear left hand side of the vehicle. Each stabilizer is controlled individually by a separate operator input, i.e. there is one operator input which only controls the right hand stabilizer and a further operator input which only controls the left hand stabilizer. Prior to using the backhoe each stabilizer is engaged with the ground.

In order to handle material, for example dig a trench, a vehicle operator must simultaneously operate all three hydraulic rams on the arm assembly and this is a skillful process. A skillful operator, when digging a trench will quickly be able to fill the bucket with material, lift the bucket out of the trench and empty the bucket to one or other side of the vehicle.

The excavation cycle generally starts with the arm assembly (i.e. the boom and the dipper) in a fully extended position and, as the trench is dug towards the rear of vehicle, the arm assembly is incrementally retracted until the boom and dipper are in a fully retracted position adjacent to the rear of the vehicle. To further extend the trench it is necessary for the operator to move the vehicle a distance to re-position the vehicle. This typically involves the operator moving the seat to a forwards facing direction and moving the vehicle by a required distance (for example the length of the arm assembly or the length of the vehicle) to the next digging position. The operator typically determines the required distance visually, usually by straining to look in the direction opposite to the direction the vehicle is travelling.

Inaccurate re-positioning of the vehicle results either in the bucket being too far from the edge of the trench to allow a continuous trench to be dug or in the bucket being replaced within the trench. In the event that the bucket is positioned too far from the edge of the trench it is necessary for the operator to correct the position of the vehicle prior to commencing the next excavation cycle, which is time consuming and inefficient. In the event that the bucket is replaced within the trench, digging is less efficient.

The operator may leave the backhoe loader in a fully extended position during re-positioning in order to more accurately measure the distance; however this adversely affects the stability of the vehicle.

SUMMARY OF THE INVENTION

Once the vehicle is in the correct position, a further excavation cycle can be carried out. This process is repeated until the trench is the desired length.

Accordingly, there is a need for an improved method of determining the distance by which the vehicle is moved during re-positioning of the vehicle between working positions.

Thus, according to the present invention there is provided a method for providing an alert for a distance travelled by a vehicle including the steps of (a) enabling an alert system; (b) setting a target distance to be travelled by the vehicle; (c) moving the vehicle; (d) comparing the distance travelled by the vehicle and the target distance; and (e) providing an alert based on the comparison.

By setting a target distance in an alert system and providing an alert based on a comparison of the distance actually travelled by the vehicle and the target distance, an operator can accurately and efficiently re-position the vehicle to the next working position, for example the next digging location, without straining to look in a direction opposite to the direction of travel of a vehicle and without the need for repeated re-positioning to ensure the vehicle is in the correct position.

In step (c) the vehicle may be moved in a forwards direction.

The vehicle may be a working vehicle, for example an excavator, or a telescopic handler, or a backhoe loader, or a material handler.

An excavator has a boom, dipper and bucket mounted next to a cab. The boom, dipper, bucket and cab are mounted on a rotating platform. The forwards direction of an excavator is the direction faced by the operator in the cab.

A telescopic handler, or telehandler, has a single telescopic boom that extends forwards from the vehicle. An attachment, for example a bucket, a pallet fork or a winch, may be fitted on the telescopic boom. The forwards direction of a telescopic handler is the direction faced by the attachment and the operator.

A backhoe loader is a working machine or vehicle having a shovel mounted on the front end of the machine or vehicle and a boom, dipper and bucket (or another attachment, for example an auger) on the rear end of the machine or vehicle. The forwards direction of a backhoe loader is the direction faced by the shovel.

The step of enabling the alert system may include detecting a signal that the working vehicle has changed from a 'working' state to a 'moving' state.

The step of detecting a signal that the working vehicle has changed from a 'working' state to a 'moving' state may include one or more of detecting that a seat for an operator of the working vehicle has moved from a rearward facing position to a forward facing position; and/or detecting that a ground engaging component of the working machine has moved from a ground engaging position to a raised position; and/or detecting that a drive direction has been selected for the vehicle; and/or detecting that the machine is moving; and/or detecting that the machine work end has been actuated or deactivated.

The ground engaging component may be a stabilizer or a blade or a shovel.

The step of enabling the alert system may include setting a start position.

The step of setting a target distance to be travelled by the vehicle may include entering the target distance in the alert system.

The step of setting a target distance to be travelled by the vehicle may include enabling the alert system at a first position, moving the vehicle to a second position and setting the distance travelled between the first position and the second position as the target distance.

The target distance may be less than 100 meters, for example less than 50 meters, for example less than 10 meters.

In use, the vehicle may be moved a distance from the first position to the second position. The vehicle may also be moved a distance from the second position to a third position, the third position being spaced apart from the second position by the target distance. The vehicle may further be moved a distance from the third position to a fourth position, the fourth position being spaced apart from the third position by the target distance.

The vehicle may include an arm having a fully extended position and a fully retracted position and the target distance may be equal to or less than the length the arm travels between the fully retracted position and the fully extended position. The arm may be mounted on the back of the vehicle. Alternatively, the arm may be mounted on the front of the vehicle.

The alert may include an alarm, for example an audible, visual or vibration alarm.

The alarm may have a frequency that increases as the difference between the distance travelled by the vehicle and the target distance decreases.

The alarm may be continuous when the distance travelled by the vehicle equals the target distance.

The method may include the step of calibrating the distance travelled by the vehicle to a specified distance.

The step of calibrating the distance travelled by the vehicle may include one or more of: measuring a known distance; placing a first marker at a first end of the known distance; placing a second marker at a second end of the known distance; moving the vehicle from one of the first or second markers to the other of the first or second markers; and setting the distance travelled between first and second markers as the specified distance.

An algorithm may be used to calculate the distance travelled by the vehicle.

A global positioning system may be used to determine the distance travelled by the machine.

The method may further include the step of activating the alert system. The step of activating the alert system may include actuating a control lever associated with a ground engaging component of the vehicle. The step of activating the alert system may include actuating a controller for the alert system.

The method may further comprise the step of disabling the alert system. The step of disabling the alert system may include detecting a signal that the vehicle has changed from a 'moving' state to a 'working' state. The step of detecting a signal that the vehicle has changed from a 'moving' state to a 'working' state may include one or more of detecting that a seat for an operator of the vehicle has moved from a forward facing position to a rearward facing position; and/or detecting that a ground engaging component of the machine has moved from a raised position to a ground engaging position; and/or detecting that vehicle is in neutral; and/or detecting speed or movement of the vehicle; and/or detecting the machine work end has been actuated or deactivated.

The method may further include the step of deactivating the alert system. The step of deactivating the alert system may include actuating a control lever associated with a ground engaging component of the vehicle. The step of deactivating the alert system may include actuating a control lever associated with a material engaging component of the vehicle. The step of deactivating the alert system may include actuating a controller for the alert system.

According to a further aspect of the invention there is provided a vehicle having an alert system for providing an alert for a distance travelled by a vehicle, the alert system being configured to receive data relating to a target distance to be travelled by the vehicle and data relating to the distance travelled by the vehicle; to compare the distance travelled by the vehicle and the target distance and to provide an alert based on the comparison.

BRIEF DESCRIPTION OF THE DRAWINGS

The invention will now be described, by way of example only, with reference to the accompanying drawings in which.

DETAILED DESCRIPTION

Figure 1:
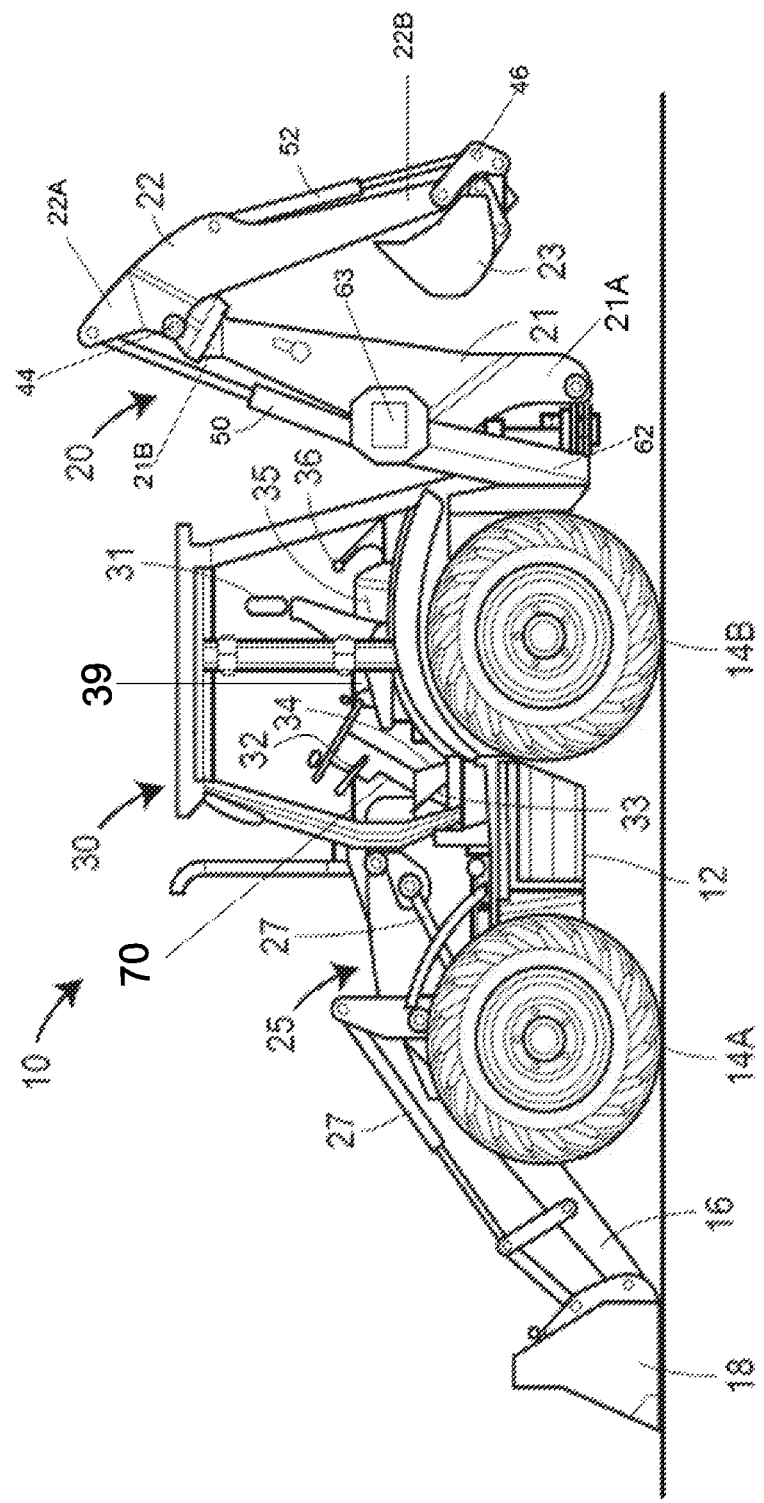
FIG. 1 is a side view of a vehicle according to the present invention.
Figure 2:
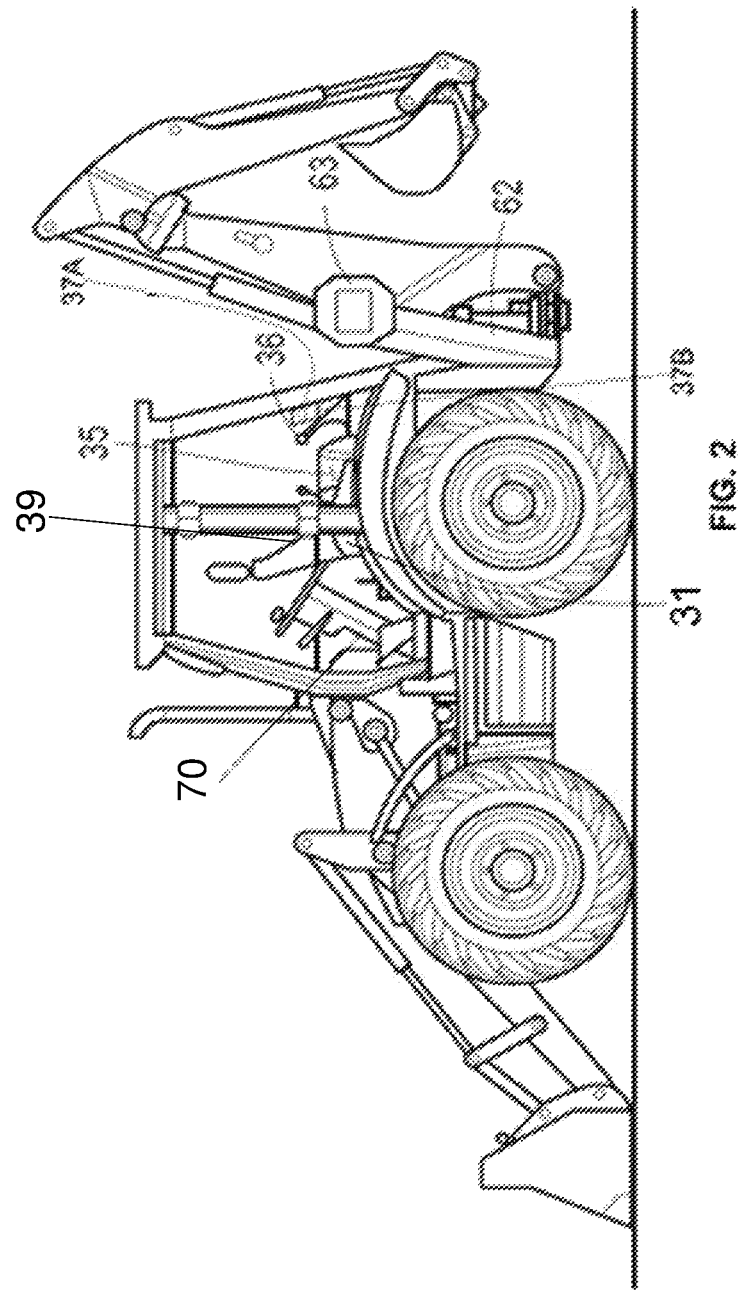
FIG. 2 is a side view of the vehicle of FIG. 1 with the operator seat facing rearwardly.
Figure 3:
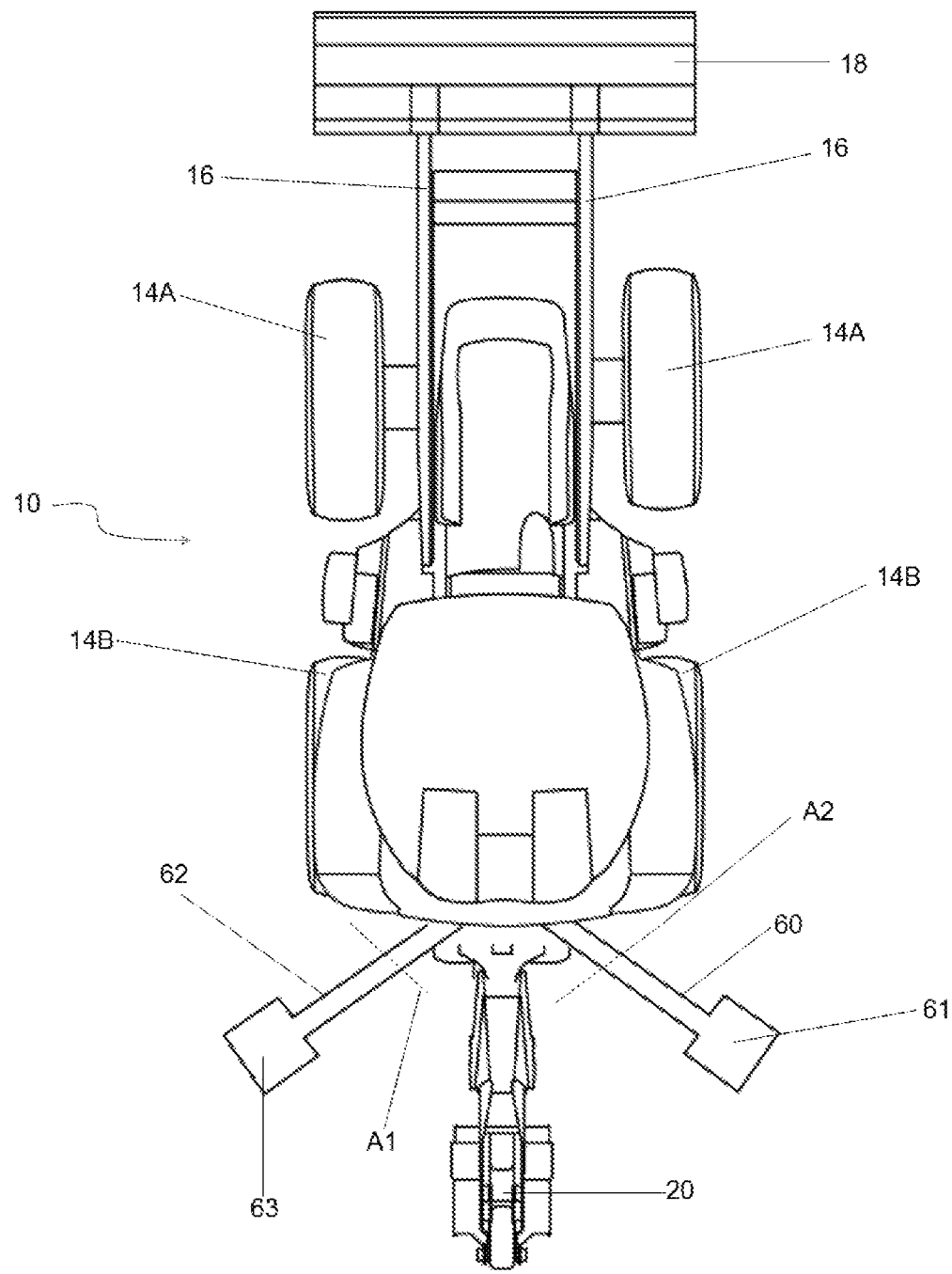
FIG. 3 shows a plan schematic view of the vehicle of FIGS. 1 and 2.

With reference to FIGS. 1 to 3 there is shown a material handling vehicle in the form of a backhoe loader 10 having a chassis 12 supported by ground engaging motive (or transport) means in the form of front wheels 14A and rear wheels 14B. Mounted on the chassis 12 is a loading arm 16 at the front of which (the work end) is mounted an implement, in this case a loading shovel 18. The loading arm 16 and loading shovel 18 are mounted on the front of the vehicle.

The vehicle also includes a rear right stabilizer 60 and rear left stabilizer 62 (see FIG. 3). The rear left stabilizer 62 is pivotably mounted to the chassis 12 of the vehicle about a generally horizontal axis A1.

Similarly, the rear right stabilizer 60 is pivotably attached to the chassis 12 about a generally horizontal axis A2.

Mounted on the back of the vehicle is a backhoe 20 having a boom 21, a dipper arm 22 and a ground-engaging implement in the form of a bucket 23 (see FIG. 1).

Figure 4:
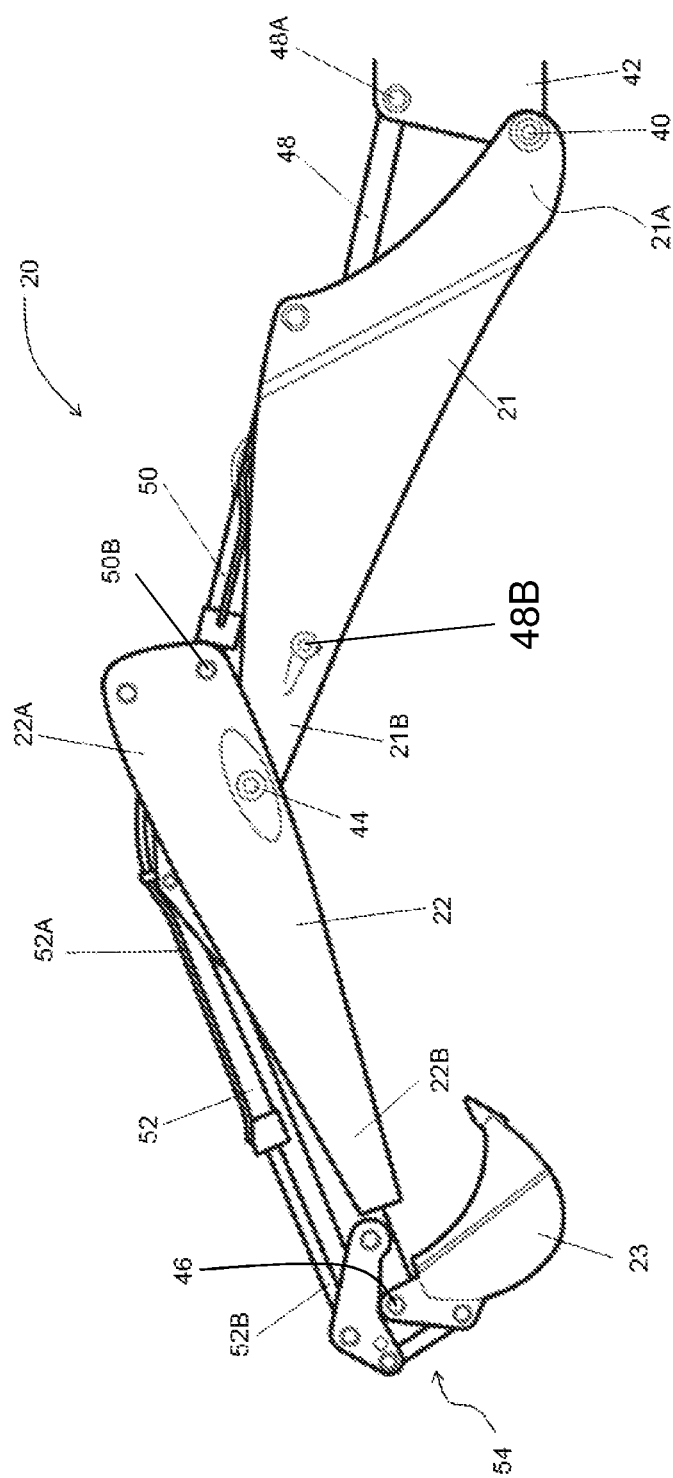
FIG. 4 shows a side view of the backhoe of the vehicle of FIGS. 1 and 2.

Referring now to FIG. 4, the boom 21 is pivotally mounted by pivot 40 to link 42 at a first end 21A of the boom 21. Link 42 is pivotally mounted at a generally vertical axis relative to the vehicle frame. Pivot 40 is orientated horizontally. The dipper arm 22 is pivotally mounted via pivot 44 to a second end 21B of the boom 21. Pivot 44 is orientated horizontally. The bucket 23 is pivotally mounted via pivot 46 to an end 22B of dipper arm 22 remote from end 22A of dipper arm 22. Pivot 46 is orientated horizontally.

A first hydraulic actuator in the form of a first hydraulic ram 48 has a first end 48A pivotally attached to the link 42 and a second end 48B pivotally attached to the boom 21 part way between the first and second ends of the boom 21. A second hydraulic actuator in the form of a second hydraulic ram 50 has a first end 50A pivotally attached to the boom 21 part way between the first and second ends of the boom 21 and a second end 50B pivotally attached to the dipper arm 22 proximate the first end 22A of the dipper arm 22. A third hydraulic actuator in the form of third hydraulic ram 52 has a first end 52A pivotally attached to the dipper arm 22 proximate the first end 22A of the dipper arm 22 and a second end 52B pivotally attached to a linkage mechanism 54 proximate the second end 22B of the dipper arm 22. The linkage mechanism 54 per se is known and simply converts extension and retraction movement of the third hydraulic ram 52 into rotary movement of the bucket 23 about pivot 46.

Contraction of the first hydraulic ram 48 causes the boom 21 to raise and extension of the first hydraulic ram 48 causes lowering of the boom 21. Contraction of the second hydraulic ram 50 causes the dipper arm 22 to move in an anti-clockwise direction (when viewing FIG. 1) about pivot 44, i.e. it causes the dipper arm 22 to move in a "dipper out" direction, and extension of the second hydraulic ram 50 causes the dipper arm 22 to move in a clockwise direction (when viewing FIG. 1) about pivot 44, i.e. in a "dipper in" direction. Contraction of the third hydraulic ram 52 causes the bucket 23 to move in an anti-clockwise direction about pivot 46, i.e. in a "dump" direction, and extension of the third hydraulic ram 52 causes the bucket 23 to move in a clockwise direction about pivot 46, i.e. in a "crowd" direction.

The first, second and third hydraulic rams 48, 50, 52 are all double acting hydraulic rams. Double acting hydraulic rams per se are known. They include a piston within a cylinder. The piston is attached to a rod which extends beyond the end of the cylinder. The end of the rod remote from the piston defines one end of the hydraulic ram. The end of the cylinder remote from the rod defines an opposite end of the hydraulic ram. A "head side chamber" is defined between the piston and the end of the cylinder remote from the rod. A "rod side chamber" is defined between the piston and the end of the cylinder proximate the rod. Pressurization of the head side chamber extends the ram and pressurization of the rod side chamber causes the ram to retract.

The vehicle includes an engine 25 which provides power to drive the vehicle over the ground. The engine 25 also provides power to operate a hydraulic pump which can selectively provide pressurized hydraulic fluid to the various rams 27, 48, 50, 52 of the vehicle to operate the loading arm 16, loading shovel 18, boom 21, dipper arm 22, bucket 23, rear right stabilizer 60, rear left stabilizer 62, etc. so as to enable material to be handled.

The vehicle includes an operator cab 30 including an operator seat 31. The operator cab includes operator controls such as a steering wheel 32, a foot brake 33, a foot throttle 34, a hand throttle 35, a dashboard control panel 39, backhoe control levers 36, a rear right stabilizer control lever 37A and a rear left stabilizer control lever 37B.

Actuation of the rear right stabilizer control lever 37A causes actuation of the hydraulic ram associated with the rear right stabilizer (not shown) to pivot the rear right stabilizer 60 from a retracted position (as shown in FIGS. 1 and 2) to a deployed position (as shown in FIG. 3) such that the pad 61 engages the ground. The rear right stabilizer control lever 37A has a detent, such that displacement of the rear right stabilizer control lever 37A is proportional to the speed of retraction up to the detent. Actuation of the rear right stabilizer control lever 37A beyond the detent causes auto retraction.

Similarly, actuation of the rear left stabilizer control lever 37B causes actuation of the hydraulic ram associated with the rear left stabilizer (not shown) to pivot the rear left stabilizer 62 from a retracted position (as shown in FIGS. 1 and 2) to a deployed position (as shown in FIG. 3) such that the pad 63 engages the ground. The rear left stabilizer control lever 37B also has a detent, such that displacement of the rear left stabilizer control lever 37B is proportional to the speed of retraction up to the detent. Actuation of the rear left stabilizer control lever 37B beyond the detent causes auto retraction.

As shown in FIG. 1, the operator seat 31 is facing forwards. The operator seat is rotatable and can be rotated to the position shown in FIG. 2, where it faces the rear of the vehicle.

The vehicle also includes a re-positioning alert system 70.

The re-positioning alert system 70 facilitates more accurate re-positioning of the vehicle. During movement of the vehicle, the alert system 70 compares the distance travelled by the vehicle with a pre-set target (or pre-determined) distance. The alert system 70 produces an alert, the frequency of which increases in proportion to the distance travelled by the vehicle. When the distance travelled by the vehicle equals the pre-set target distance, the alert is continuous and hence the operator knows the vehicle has travelled the target distance.

The dashboard control panel 39 includes a 're-positioning alert system' menu for use in calibrating the system and setting the pre-set target distance, as will be described further. The 're-positioning alert system' menu includes the following sub-menus: a 'calibration' sub-menu, a 'target distance' sub-menu and an 'activation' sub-menu.

Calibration and use of the re-positioning alert system 70 will now be described.

Calibration of the Re-Positioning Alert System 70

When a vehicle including a re-positioning alert system 70 is first produced or if the operator changes the rim or tire size, the vehicle is calibrated to actual ground distance. This requires measuring and marking out a known distance on flat, level ground in a straight line and positioning the vehicle on a marker at the start of the measured distance. The operator then selects the 're-positioning alert system' menu on the dashboard control panel 39 and then selects the 'calibration' sub-menu. When prompted, the operator selects 'start' on the 'calibration' sub-menu and drives to a marker at the end of the measured distance. When the vehicle reaches the end marker, the vehicle is stopped and 'stop' is selected on the 'calibration' sub-menu. When prompted, the operator selects 'accept' on the calibration sub-menu in order to accept the new calibration for the re-positioning alert system 70. The re-positioning alert system 70 relates the distance travelled with a signal from the vehicle that is indicative of the distance travelled in order to measure future distances travelled.

In an alternative embodiment, calibration could take place using an algorithm which, knowing the gear ratios of the drive train system, the wheel size and the tire size, can calculate the actual distance travelled by the vehicle and auto calibrate. In a further alternative embodiment, the vehicle could be calibrated using a Global Positioning System (GPS) to determine the actual distance travelled by the vehicle.

Setting the Target Distance

When an operator needs to use the re-positioning alert system 70, it is necessary to set a target distance that matches the work to be carried out, the type of vehicle, and the attachment to be used for the work. The target distance is the distance between a first working position of the machine and a second working position of the machine. The target distance may, for example, be set to match the optimum length of a trench which can be dug before re-positioning of the vehicle is required, or to the distance between successive poles or holes to be dug in a line. The target distance can be set in a number of ways, examples of which are described below.

In one embodiment of the invention, the operator selects the 'target distance' sub-menu in the 're-positioning alert system' menu of the dashboard control panel 39, selects 'set distance' and then manually enters a distance in either meters or feet. The target distance is set by selecting 'accept' when prompted.

Alternatively, the operator may select the 'target distance' sub-menu in the 're-positioning alert system' menu of the dashboard control panel 39, then select the 'drive distance' option. The operator may then select 'start', drive the vehicle the required distance, stop the vehicle and then select 'stop'. The target distance is set by selecting 'accept' when prompted. Using this approach, the distance travelled by the vehicle becomes the target distance.

Activating the re-positioning alert system 70.

The re-positioning alert system 70 can be selectively activated or de-activated by the operator. The re-positioning alert system 70 may be activated in a number of different ways, examples of which are described below.

In one embodiment of the invention, the re-positioning alert system 70 is activated by the operator actuating both the rear right stabilizer control lever 37A and the rear left stabilizer control lever 37B and holding the levers 37A, 37B in the actuated position (beyond the detent) for a period of time, for example more than 5 seconds.

Alternatively, an operator can select the 'activation' sub-menu in the 're-positioning alert system' menu on the dashboard control panel 39 and select 'on' or 'activate'.

Enabling the re-positioning alert system 70.

With the re-positioning alert system 70 activated, the operator enables the re-positioning alert system 70 by one or more of:

(a) actuating both the rear right stabilizer control lever 37A and the rear left stabilizer control lever 37B beyond their detents to raise each of the rear right stabilizer 60 and rear left stabilizer 62 to the fully retracted positions and bring each of the pads 61, 63 out of contact with the ground; and/or (b) moving the operator seat 31 to the forward facing position; and/or (c) selecting a drive direction (e.g. forwards) and moving the vehicle; and/or (d) by a GPS or transmission detecting movement of the vehicle.

In this condition, the vehicle is in a 'moving' state.

Enabling the activated re-positioning alert system 70 triggers the start position and the alert starts at a slow frequency. As the vehicle is moved, the frequency of the alert increases as the target distance is approached. When the distance travelled equals the target distance, the alert is continuous and hence the operator knows that the vehicle has travelled the target distance.

The Re-Positioning Alert

In one embodiment of the invention, the alert is an audible alarm having a frequency such that the alarm tones are separated by silent pauses. As the difference between the distance travelled by the vehicle and the target distance decreases, the frequency of the alarm tones increases. When the distance travelled by the vehicle equals the target distance, the alarm is continuous and hence the operator knows the vehicle has travelled the target distance.

In alternative embodiments, the alert may be a visual alert, for example a flashing light displayed in the operator cab 30. In this embodiment, the frequency of the light flashes increase as the difference between the distance travelled by the vehicle and the target distance decreases. When the distance travelled by the vehicle equals the target distance, the light is continuously lit and hence the operator knows the vehicle has travelled the target distance. Alternatively, the visual alert may be a lit bar chart on the vehicle dashboard, the number of lit bars increasing or decreasing as the distance travelled by the vehicle approaches the target distance. The color of the lights may change in relation to the distance travelled by the vehicle.

Alternatively, the alert may be a vibration signal, the frequency of which increases as the difference between the distance travelled by the vehicle and the target distance decreases. In this example, when the distance travelled by the vehicle equals the target distance, the vibration alert is continuous and hence the operation knows the vehicle has travelled the target distance.

Disabling the Re-Positioning Alert System 70

The re-positioning alert system may be disabled by one or more of:

(a) the operator stopping movement of the vehicle; and/or (b) the direction control moving to neutral or changing direction; and/or (c) the operator rotating the seat 31 to the rear facing direction (as shown in FIG. 2); and/or (d) actuating both the rear right stabilizer control lever 37A and/or the rear left stabilizer control lever 37B to cause one or both of the rear right stabilizer 60 and rear left stabilizer 62 to be moved; and/or (e) actuating a control switch or button for the re-positioning alert system 70; and/or (f) actuating controls, for example loader or excavator controls.

In this condition, the vehicle is in a 'working' state.

The re-positioning alert system 70 is disabled if the distance travelled by the vehicle exceeds the target distance by more than a specified distance, for example 1 meter, and hence the alert will stop.

The re-positioning alert system 70 may also be disabled if the operator changes the direction in which the vehicle is moving, and hence the alert will stop.

Deactivating the Re-Positioning Alert System 70

The re-positioning alert system 70 may be deactivated in a number of ways, examples of which are described below.

In one embodiment of the invention, the re-positioning alert system 70 is deactivated by the operator actuating both the rear right stabilizer control lever 37A and the rear left stabilizer control lever 37B and holding the levers 37A, 37B in the actuated position (beyond the detent) for a period of time, for example more than 5 seconds.

Alternatively, the operator can select the 'activation' sub-menu in the 're-positioning alert system' menu on the dashboard control panel 39 and select 'off' or 'deactivate'.

Examples of use of the re-positioning alert system 70 will now be described.

EXAMPLE 1

Digging a Trench

The vehicle is driven to the site.

The operator stops the vehicle at the position required for starting the trench (the first position) and puts the vehicle in neutral. The operator rotates the seat 31 to the rear facing direction (as shown in FIG. 2) and actuates both the rear right stabilizer control lever 37A and the rear left stabilizer control lever 37B to cause each of the rear right stabilizer 60 and rear left stabilizer 62 to be deployed by an appropriate amount so that each of the pads 61, 63 is brought into engagement with the ground.

The operator then digs the first part of the trench, using the backhoe control levers 36 to move the boom 21 and dipper arm 22 in a "dipper out" direction thereby moving the bucket 23 away from the chassis 12. The boom 21 is then further lowered such that the bucket teeth (not shown) engage the ground. The bucket 23 is then crowded slightly so as to start to move the bucket teeth through the ground. The dipper arm 22, boom 21 and bucket 23 are then operated to move the dipper arm 22 in a "dipper in" direction and to move the boom 21 in a "boom raised" direction and to move the bucket in a "crowd" direction such that the bucket teeth move towards the chassis 12 to fill the bucket 23 with ground material. Once the bucket 23 is full, the boom 21 is raised, the backhoe 20 is swung laterally relative to the vehicle and the ground material is then dumped by moving the bucket 23 to a "dumped" position. The sequence is then repeated. As the bucket 23 is returned to the trench it is positioned closer to the rear of the vehicle ready to take the next load of ground material.

Once the trench has been dug close to the rear of the vehicle and the vehicle needs to be re-positioned, the operator actuates both the rear right stabilizer control lever 37A and the rear left stabilizer control lever 37B beyond their detents to raise each of the rear right stabilizer 60 and rear left stabilizer 62 to the fully retracted positions, with each of the pads 61, 63 out of contact with the ground.

The operator turns the seat 31 to the forward facing position, selects the 'target distance' sub-menu in the 're-positioning alert system' menu of the dashboard control panel 39, then selects the 'drive distance' option. The operator then selects 'start', selects a drive direction (e.g. forwards), drives the vehicle a chosen distance to allow continued excavation of the trench, stops the vehicle (at the second position) and then selects 'stop'. The target distance (i.e. the distance between the first position and the second position) is set by selecting 'accept' when prompted.

The operator puts the drive selector to neutral, returns the seat 31 to the rear facing position and actuates both the rear right stabilizer control lever 37A and the rear left stabilizer control lever 37B to lower each of the rear right stabilizer 60 and rear left stabilizer 62 by an appropriate amount so that each of the pads 61, 63 is brought into engagement with the ground.

The operator then uses the backhoe control levers 36 as described above to excavate the second section of the trench.

When the second section of the trench is completed and the vehicle needs to be re-positioned, the operator actuates both the rear right stabilizer control lever 37A and the rear left stabilizer control lever 37B beyond their detents to raise each of the rear right stabilizer 60 and rear left stabilizer 62 to the fully retracted positions, with each of the pads 61, 63 out of contact with the ground.

If the re-positioning alert system 70 is in the 'activated' state, a short beep will sound.

If the re-positioning alert system 70 is in the 'deactivated' state, no sound will be heard. The operator can activate the alert system 70 using any of the approaches described above.

Once the alert system 70 is activated, the operator moves the operator seat 31 to the forward facing position and selects a drive direction (e.g. forwards), which triggers the start position and the alert starts to beep at a slow rate. The vehicle is driven as normal with the frequency of the beeps increasing as the target distance is approached. When the distance travelled equals the target distance (i.e. when the operator reaches a third position), the alert produced is a solid tone.

The operator stops the vehicle at the position required for the third section of the trench, puts the drive selector to neutral, returns the seat 31 to the rear facing position and actuates both the rear right stabilizer control lever 37A and the rear left stabilizer control lever 37B to lower each of the rear right stabilizer 60 and rear left stabilizer 62 to be deployed by an appropriate amount so that each of the pads 61, 63 is brought into engagement with the ground.

The operator then uses the backhoe control levers 36 as described above to excavate the third section of the trench.

The process is repeated and the vehicle moved to successive positions each separated by the target distance until the trench is the desired length.

The operator then actuates both the rear right stabilizer control lever 37A and the rear left stabilizer control lever 37B beyond their detents to raise each of the rear right stabilizer 60 and rear left stabilizer 62 to the fully retracted positions, with each of the pads 61, 63 out of contact with the ground. The operator moves the operator seat 31 to the forward facing position and selects a drive direction (e.g. forwards).

The operator can either deactivate the re-positioning alert system 70 by actuating both the rear right stabilizer control lever 37A and the rear left stabilizer control lever 37B and holding the levers 37A, 37B in the actuated position (beyond the detent) for a period of time, for example more than 5 seconds or by selecting the 'activation' sub-menu in the 're-positioning alert system' menu on the dashboard control panel 39 and selecting 'off' or 'deactivate'.

Alternatively, the operator can drive the vehicle as normal (with the alert system 70 producing an alarm). Once the vehicle has been driven further than the target distance by more than a specified distance, for example 1 meter, the alert system 70 will be disabled. In this state, the alerts will not sound while the vehicle is being driven, but the alert system 70 will be active and ready for subsequent use.

EXAMPLE 2

Auguring Holes for Telegraph Poles

The vehicle is driven to the site. The operator stops the vehicle at the position required for the first telegraph pole (the first position) and puts the vehicle in neutral.

The operator selects the 'target distance' sub-menu in the 're-positioning alert system' menu of the dashboard control panel 39, selects 'set distance' and then manually enters a distance in either meters or feet. The target distance is set by selecting 'accept' when prompted.

The operator rotates the seat 31 to the rear facing position (as shown in FIG. 2). The operator actuates both the rear right stabilizer control lever 37A and the rear left stabilizer control lever 37B to cause each of the rear right stabilizer 60 and rear left stabilizer 62 to be deployed by an appropriate amount so that each of the pads 61, 63 is brought into engagement with the ground.

The operator then augers the first hole.

The operator then actuates both the rear right stabilizer control lever 37A and the rear left stabilizer control lever 37B beyond their detents to raise each of the rear right stabilizer 60 and rear left stabilizer 62 to the fully retracted positions, with each of the pads 61, 63 out of contact with the ground.

If the re-positioning alert system 70 is in the 'activated' state, a short beep will sound.

If the re-positioning alert system 70 is in the 'deactivated' state, no sound will be heard. The operator can activate the alert system 70 as described above.

The operator rotates the seat 31 to the forward facing position (as shown in FIG. 1). Once the alert system 70 is activated, the operator selects a drive direction (e.g. forwards), which triggers the start position and the alert starts to beep at a slow rate. The vehicle is driven as normal with the frequency of the beeps increasing as the target distance is approached. When the distance travelled equals the target distance, the alert produced is a solid tone.

The operator stops the vehicle at the position required for the second hole (the second position), puts the drive selector to neutral, rotates the seat 31 to the rear facing position and actuates both the rear right stabilizer control lever 37A and the rear left stabilizer control lever 37B to lower each of the rear right stabilizer 60 and rear left stabilizer 62 by an appropriate amount so that each of the pads 61, 63 is brought into engagement with the ground.

The operator then uses the auger to create a hole for the second telegraph pole.

The process is repeated until the required number of holes have been augured. In each case, the vehicle is moved to successive positions each separated by the target distance.

The operator then rotates the seat 31 to the forward facing position and actuates both the rear right stabilizer control lever 37A and the rear left stabilizer control lever 37B beyond their detents to raise each of the rear right stabilizer 60 and rear left stabilizer 62 to the fully retracted positions, with each of the pads 61, 63 out of contact with the ground. The operator selects a drive direction (e.g. forwards) and moves the vehicle away from the holes.

The operator can either deactivate the re-positioning alert system 70 by actuating both the rear right stabilizer control lever 37A and the rear left stabilizer control lever 37B and holding the levers 37A, 37B in the actuated position (beyond the detent) for a period of time, for example more than 5 seconds or by selecting the 'activation' sub-menu in the 're-positioning alert system' menu on the dashboard control panel 39 and selecting 'off' or 'deactivate'.

Alternatively, the operator can drive the vehicle as normal (with the alert system 70 producing an alarm). Once the vehicle has been driven further than the target distance by more than a specified distance, for example 1 meter, the alert system 70 will be disabled. In this state, the alerts will not sound while the vehicle is being driven, but the alert system 70 will be active and ready for subsequent use.

In the examples described above, the alert system 70 is used in vehicles that are being used to dig a trench and auger holes for telegraph poles. It will be understood that in alternative embodiments the vehicle may be used to move grids or fence posts for installation at defined spaces or distances along a road or route or for any other purpose where it is beneficial to know the distance a vehicle has travelled compared to a target distance.

In the embodiments described above, the re-positioning alert system 70 can be activated and deactivated and enabled and disabled by operation of the rear right stabilizer control lever and the rear left stabilizer control lever. It will be understood that in alternative embodiments of the invention, other control levers associated with other ground engaging components of the vehicle, for example the blade control lever, may be used to activate and/or deactivate and/or enable and/or disable the alert system or the loader control may be used as the shovel will be lifted on and off the ground during repositioning of the vehicle.

The re-positioning alert system 70 may be activated and/or deactivated and/or enabled and/or disabled by any one or more of the following:

1) moving a ground engaging part of the vehicle, for example one or both of the stabilizers and/or the blade and/or the shovel; and/or 2) selecting a control for a ground engaging part of the machine, for example the stabilizer auto up control and/or the loader enable switch and/or the loader control; and/or 3) turning or changing the position of the operator's seat; and/or 4) de-activating the excavator or loader controls; and/or 5) selecting a drive control or direction; and/or 6) detecting movement of the vehicle by GPA or using a speed sensor; and/or 7) selecting or de-selecting the park brake control; and/or 8) selecting or de-selecting the loader control; and/or 9) moving the work end of the vehicle, for example the excavator or the loader; and/or 10) selecting or de-selecting a reposition alarm control or button; and/or 11) changing the mode of the vehicle, for example changing from working mode to travelling mode, for example by activating a mode switch.

The invention claimed is:

1. A method for providing an alert for a distance travelled by a working vehicle including the steps:
   (a) enabling an alert system in response to detecting a signal that the working vehicle has changed from a working state to a moving state and, in response to enabling the alert system:
   (b) setting a target distance to be travelled by the working vehicle;
   (c) moving the working vehicle;
   (d) comparing the distance travelled by the working vehicle and the target distance; and
   (e) providing an alert based on the comparison wherein the alert includes an alarm; and further including the step of activating the alert system in response to actuating a control lever associated with a ground engaging component of the working vehicle.

2. A method according to claim 1, wherein the working vehicle is at least one of an excavator, or a telescopic handler, or a backhoe loader.

3. A method according to claim 1, wherein in the step of detecting the signal that the working vehicle has changed from a working state to a moving state includes one or more of:
   (i) detecting that a seat for an operator of the working vehicle has moved from a rearward facing position to a forward facing position; and
   (ii) detecting that a ground engaging component of the working vehicle has moved from a ground engaging position to a raised position; and
   (iii) detecting that a drive direction has been selected for the working vehicle; and
   (iv) detecting that the working vehicle is moving; and
   (v) detecting that the work end of the working vehicle has been actuated or deactivated.

4. A method according to claim 3, wherein the ground engaging component is at least one of a stabilizer or a blade or a shovel.

5. A method according to claim 1, wherein the step of enabling the alert system includes setting a start position.

6. A method according to claim 1, wherein the step of setting a target distance to be travelled by the working vehicle includes entering the target distance in the alert system, or wherein the step of setting a target distance to be travelled by the working vehicle includes enabling the alert system at a first position, moving the working vehicle to a second position and setting the distance travelled between the first position and the second position as the target distance.

7. A method according to claim 1, wherein the target distance is less than 100 meters, or wherein the target distance is less than 50 meters, or wherein the target distance is less than 10 meters.

8. A method according to claim 1, wherein the working vehicle includes an arm having a fully extended position and a fully retracted position and the target distance is equal to or less than the length the arm travels between the fully retracted position and the fully extended position.

9. A method according to claim 1, wherein the alarm includes at least one of an audible, visual or vibration alarm, and wherein the alarm has a frequency that increases as the difference between the distance travelled by the working vehicle and the target distance decreases, or wherein the alarm is continuous when the distance travelled by the working vehicle equals the target distance.

10. A method according to claim 1, further comprising a step of calibrating the distance travelled by the working vehicle to a specified distance, wherein the step of calibrating the distance travelled by the working vehicle includes:
   (a) measuring a known distance;
   (b) placing a first marker at a first end of the known distance;
   (c) placing a second marker at a second end of the known distance;
   (d) moving the working vehicle from one of the first or second markers to the other of the first or second markers; and
   (e) setting the distance travelled between first and second markers as the specified distance, or wherein an algorithm is used to calculate the distance travelled by the working vehicle, or wherein a global positioning system is used to determine the distance travelled by the working vehicle.

11. A method according to claim 1, further comprising a step of disabling the alert system, wherein the step of disabling the alert system includes detecting the signal that the working vehicle has changed from a moving state to a working state, and wherein the step of detecting the signal that the working vehicle has changed from a 'moving' state to a 'working' state includes one or more of:
   (i) detecting that a seat for an operator of the working vehicle has moved from a forward facing position to a rearward facing position; and
   (ii) detecting that a ground engaging component of the working vehicle has moved from a raised position to a ground engaging position; and
   (iii) detecting that working vehicle is in neutral; and
   (iv) detecting speed or movement of the working vehicle; and
   (v) detecting the working vehicle work end has been actuated or deactivated.

12. A method according to claim 1, further including a step of deactivating the alert system, wherein the step of deactivating the alert system includes actuating a control lever associated with a ground engaging component of the working vehicle, or wherein the step of deactivating the alert system includes actuating a control lever associated with a material engaging component of the working vehicle, or wherein the step of deactivating the alert system includes actuating a controller for the alert system.

13. A method for providing an alert for a distance travelled by a working vehicle between digging locations including the steps:
   (a) enabling an alert system in response to detecting a signal that the working vehicle has changed from a working state to a moving state, and setting a start position at a first digging location;
   (b) setting a target distance to be travelled by the working vehicle;
   (c) moving the working vehicle to a second digging location;
   (d) comparing the distance travelled by the working vehicle between the first and second digging locations and the target distance;
   (e) providing an alert based on the comparison, wherein the alert includes an alarm.

14. A method according to claim 13, wherein the working vehicle includes an arm having a fully extended position and a fully retracted position and the target distance is equal to or less than the length the arm travels between the fully retracted position and the fully extended position.

15. A method according to claim 13, wherein the working vehicle performs a first digging operation at the first digging location and a second digging operation at the second digging location.

16. A method for providing an alert for a distance travelled by a working vehicle including the steps:
   (a) enabling an alert system in response to detecting a signal that the working vehicle has changed from a working state to a moving state and, in response to enabling the alert system:
   (b) setting a target distance to be travelled by the working vehicle;
   (c) moving the working vehicle;
   (d) comparing the distance travelled by the working vehicle and the target distance;

(e) providing an alert based on the comparison, wherein the alert includes an alarm;
wherein in the step of detecting the signal that the working vehicle has changed from a working state to a moving state includes detecting that a seat for an operator of the working vehicle has moved from a rearward facing position to a forward facing position.

17. A method according to claim 16, wherein the working vehicle includes an arm having a fully extended position and a fully retracted position and the target distance is equal to or less than the length the arm travels between the fully retracted position and the fully extended position.

18. A method according to claim 16, wherein the step of enabling the alert system includes setting a start position at a first digging location, wherein the step of moving the working vehicle includes moving the working vehicle to a second digging location, and wherein the step of comparing the distance travelled by the working vehicle and the target distance includes comparing the distance travelled by the working vehicle between the first and second digging locations and the target distance.

19. A method according to claim 18, wherein the working vehicle performs a first digging operation at the first digging location and a second digging operation at the second digging location.

\* \* \* \* \*